(12) United States Patent
Hutchinson et al.

(10) Patent No.: US 11,605,198 B2
(45) Date of Patent: Mar. 14, 2023

(54) SYSTEMS AND METHODS FOR GENERATING DYNAMIC REAL-TIME HIGH-QUALITY LIGHTING FOR DIGITAL ANIMATION

(71) Applicant: Baobab Studios Inc., Redwood City, CA (US)

(72) Inventors: Michael Scott Hutchinson, San Carlos, CA (US); Timothy Edward Wilson, San Mateo, CA (US); David Thomas Blizard, San Francisco, CA (US); Meith Jhaveri, San Francisco, CA (US); Lawrence David Cutler, San Francisco, CA (US); Apostolos Lerios, Austin, TX (US)

(73) Assignee: Baobab Studios Inc., Redwood City, CA (US)

( * ) Notice: Subject to any disclaimer, the term of this patent is extended or adjusted under 35 U.S.C. 154(b) by 0 days.

(21) Appl. No.: 16/456,788

(22) Filed: Jun. 28, 2019

(65) Prior Publication Data

US 2020/0005525 A1 Jan. 2, 2020

Related U.S. Application Data

(60) Provisional application No. 62/692,594, filed on Jun. 29, 2018.

(51) Int. Cl.
*G06T 15/50* (2011.01)
*G06T 13/20* (2011.01)

(52) U.S. Cl.
CPC ............ *G06T 15/506* (2013.01); *G06T 13/20* (2013.01); *G06T 15/503* (2013.01)

(58) Field of Classification Search
None
See application file for complete search history.

(56) References Cited

U.S. PATENT DOCUMENTS 6,529,194 B1 * 3/2003 Yamaguchi ............. G06T 15/60
345/426
6,567,083 B1 * 5/2003 Baum .................... G06T 15/506
345/426

(Continued)

OTHER PUBLICATIONS

Sharif Elcott, Kay Chang, Masayoshi Miyamoto, Napaporn Metaaphanon, "Rendering Techniques of Final Fantasy XV", Jul. 28, 2016, ACM, ACM SIGGRAPH 2016 Talks, article No. 48, pp. 1-4.*

(Continued)

*Primary Examiner* — Robert Bader
(74) *Attorney, Agent, or Firm* — Sheppard Mullin Richter & Hampton LLP (57) ABSTRACT

Systems, methods, and non-transitory computer-readable media can receive a first set of static lighting information associated with a first static lighting setup and a second set of static lighting information associated with a second static lighting setup. The first set of static lighting information and the second set of static lighting information are associated with a scene to be rendered. A first set of global illumination information is precomputed based on the first set of static lighting information. A second set of global illumination information is precomputed based on the second set of static lighting information. The first and second sets of global illumination information are blended to derive a blended set of global illumination information. The scene is rendered in a real-time application based on the blended set of global illumination information.

20 Claims, 5 Drawing Sheets

(56) References Cited

U.S. PATENT DOCUMENTS

| | | | |
|---|---|---|---|
| 2003/0179197 A1* | 9/2003 | Sloan | G06T 15/506 345/426 |
| 2010/0045676 A1 | 2/2010 | Wyborn et al. | |
| 2015/0290539 A1* | 10/2015 | Lemer | A63F 13/92 463/33 |
| 2017/0294042 A1 | 10/2017 | Engel | |
| 2018/0093183 A1* | 4/2018 | Leblanc | A63F 13/52 |
| 2019/0228567 A1* | 7/2019 | Park | G06T 15/50 |

OTHER PUBLICATIONS

Natalya Tatarchuk, "Irradiance Volumes for Games", Sep. 1, 2005, Game Developers Conference Europe, slides 1-59.*

Sharif Elcott, Kay Chang, Masayoshi Miyamoto, Napaporn Metaaphanon, Remi Driancourt, "Rendering Techniques of Final Fantasy XV", Jul. 28, 2016, ACM, SIGGRAPH 2016 presentation slides, slides 1-83.*

Gene Greger, Peter Shirley, Philip M. Hubbard, Donald P. Greenberg, "The Irradiance Volume", Apr. 1998, IEEE, IEEE Computer Graphics and Applications, vol. 18, Issue 2, pp. 32-43.*

Anders Wang Kristensen, Tomas Akenine-Moller, Henrik Wann Jensen, "Precomputed Local Radiance Transfer for Real-Time Lighting Design", Jul. 2005, ACM, SIGGRAPH '05: ACM SIGGRAPH 2005 Papers, pp. 1208-1215.*

Ned Greene, "Environment Mapping and Other Applications of World Projections", Nov. 1986, IEEE, IEEE Computer Graphics and Applications, vol. 6, Issue 11, pp. 21-29.*

Jaroslav Křivánek, "Introduction to GI", Jul. 29, 2010, ACM, SIGGRAPH 2010 Course: Globail Illumination Across Industries, slideshow presentation, slides 1-22.*

Chris Hall, Rob Hall, Dave Edwards, "Rendering in Cars 2", 2011, ACM, ACM SIGGRAPH 2011 courses.*

Rafal Mantiuk, Sumanta Pattanaik, Karol Myszkowski, "Cube-Map Data Structure for Interactive Global Illumination Computation in Dynamic Diffuse Environments", Sep. 29, 2002, International Conference on Computer Vision and Graphics.*

Thorsten Grosch, Tobias Eble, Stefan Mueller, "Consistent Interactive Augmentation of Live Camera Images with Correct Near-field Illumination", Nov. 2007, ACM, VRST '07: Proceedings of the 2007 ACM symposium on Virtual reality software and technology, pp. 125-132.*

International Patent Application No. PCT/US2019/039971, International Search Report and Written Opinion dated Sep. 20, 2019, 6 pages.

* cited by examiner

Receive a first set of static lighting information associated with a first static lighting setup and a second set of static lighting information associated with a second static lighting setup, wherein the first set of static lighting information and the second set of static lighting information are associated with a scene to be rendered
402

Precompute a first set of global illumination information based on the first set of static lighting information
404

Precompute a second set of global illumination information based on the second set of static lighting information
406

Blend the first set of global illumination information and the second set of global illumination information to derive a blended set of global illumination information
408

Render the scene in a real-time application based on the blended set of global illumination information
410

SYSTEMS AND METHODS FOR GENERATING DYNAMIC REAL-TIME HIGH-QUALITY LIGHTING FOR DIGITAL ANIMATION

CROSS-REFERENCE TO RELATED APPLICATIONS

This application claims priority to U.S. Provisional Patent Application No. 62/692,594, filed on Jun. 29, 2018 and entitled "SYSTEMS AND METHODS FOR LIGHTING SYSTEM BLENDING IN REAL-TIME VIRTUAL REALITY SYSTEMS," which is incorporated herein by reference in its entirety.

FIELD OF THE INVENTION

The present technology relates to the field of digital animation. More particularly, the present technology relates to techniques for generating dynamic, high-quality lighting for real-time digital animation applications.

BACKGROUND

Virtual Reality (VR) and Augmented Reality (AR) are new mediums for entertainment and storytelling that enable content creators to immerse the viewer in ways that are not possible in other mediums. VR and AR are powerful immersive platforms to tell engaging stories with characters that audiences can empathize with, much as one would experience in literature or cinema. Real-time cinematic lighting is a critical aspect of creating immersive VR and/or AR experiences. However, the performance constraints of real-time rendering can limit the fidelity of such experiences.

SUMMARY

Various embodiments of the present technology can include systems, methods, and non-transitory computer readable media configured to receive a first set of static lighting information associated with a first static lighting setup and a second set of static lighting information associated with a second static lighting setup. The first set of static lighting information and the second set of static lighting information are associated with a scene to be rendered. A first set of global illumination information is precomputed based on the first set of static lighting information. A second set of global illumination information is precomputed based on the second set of static lighting information. The first and second sets of global illumination information are blended to derive a blended set of global illumination information. The scene is rendered in a real-time application based on the blended set of global illumination information.

In an embodiment, the first set of global illumination information comprises a first set of lightmap data, the second set of global illumination information comprises a second set of lightmap data, and the blending the first set of global illumination information and the second set of global illumination information comprises blending the first set of lightmap data and the second set of lightmap data.

In an embodiment, the first set of global illumination information comprises a first set of light probe data, the second set of global illumination information comprises a second set of light probe data, and the blending the first set of global illumination information and the second set of global illumination information comprises blending the first set of light probe data and the second set of light probe data.

In an embodiment, the first set of global illumination information comprises a first set of reflection probe data, the second set of global illumination information comprises a second set of reflection probe data, and the blending the first set of global illumination information and the second set of global illumination information comprises blending the first set of reflection probe data and the second set of reflection probe data.

In an embodiment, the blended set of global illumination information changes over time as the scene is being rendered.

In an embodiment, the blended set of global illumination information changes over time as the scene is being rendered by changing a first weight associated with the first set of global illumination information over time as the scene is being rendered.

In an embodiment, the rendering the scene based on the blended set of global illumination information comprises rendering the scene in a real-time immersive application based on the blended set of global illumination information.

In an embodiment, a third set of static lighting information associated with a third static lighting setup is received. A third set of global illumination information is precomputed based on the third set of static lighting information. Blending the first set of global illumination information and the second set of global illumination information to derive a blended set of global illumination information further comprises blending the first set of global illumination information, the second set of global illumination information, and the third set of global illumination information to derive the blended set of global illumination information In an embodiment, the global illumination information undergoes further processing prior to blending the first set of global illumination information and the second set of global illumination information. The further processing comprises at least one of: down-sampling the first set of global illumination information and the second set of global illumination information or caching the first set of global illumination information and the second set of global illumination information.

In an embodiment, dynamic light information associated with one or more dynamic lights and dynamic scene information associated with one or more dynamic objects to be computed at runtime are received. Rendering the scene in the real-time application is performed further based on the dynamic light information and the dynamic scene information.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Dynamic High-Quality Lighting for Real-Time Digital Animation

Virtual Reality (VR) and Augmented Reality (AR) are new mediums for entertainment and storytelling that enable content creators to immerse the viewer in ways that are not possible in other mediums. VR and AR are powerful immersive platforms to tell engaging stories with characters that audiences can empathize with, much as one would experience in literature or cinema. Real-time cinematic lighting is a critical aspect of creating immersive VR and/or AR experiences. However, the performance constraints of real-time rendering can limit the fidelity of such experiences.

It can be appreciated that computing constraints inherent in most real-time applications, such as gaming or VR/AR, require certain computational trade-offs compared to non-real-time applications, such as motion pictures. Video games will typically render a single viewpoint at 30 or 60 frames per second (FPS). As such, any rendering computations must take place within milliseconds. VR projects have even greater computing requirements, as they will generally render two viewpoints (one for each eye) at 90 FPS. Due to these computing constraints, conventional approaches to lighting in real-time digital animation are typically limited to a small number of lights that can be computed at runtime. However, this can force considerable creative compromise on content creators, and can produce less-than-satisfactory results. Conventional approaches may not be effective in addressing these and other problems arising in computer technology.

An improved approach rooted in computer technology overcomes the foregoing and other disadvantages associated with conventional approaches specifically arising in the realm of computer technology. The present technology provides an innovative lighting system for real-time digital animation that blends between any number of unique lighting setups with minimal runtime cost so that content creators are not constrained to a single real-time lighting setup. In general, for a scene that will be rendered in real-time in a digital animation, a plurality of static lighting setups can be created. Each static lighting setup may define a unique lighting setup, and each static lighting setup can be processed "offline" as a precomputation step. Offline precomputation of each static lighting setup can generate, for each static lighting setup, a set of global illumination information. Each set of global illumination information can include, for example, lightmap data defining one or more lightmaps, reflection probe data defining one or more reflections probes, light probe data defining one or more light probes, and the like. A renderer can be provided with the plurality of sets of global illumination information. The scene can be rendered based on the plurality of static lighting setups and the associated plurality of sets of global illumination information. When the scene is being rendered, the renderer can blend between the plurality of static lighting setups by blending the corresponding sets of global illumination information. By pre-computing global illumination information for each static lighting setup, the renderer does not have to perform these computations in real-time, and blending of multiple sets of global illumination information is a trivial operation that can be performed in real-time without negatively affecting runtime performance.

The present technology enables content creators to fully utilize global illumination and reflections in changing lighting environments without the runtime performance cost. The lighting artist has creative control of how the static lighting setups blend over time. With this approach, the present technology achieves many of the benefits of global illumination without the additional overhead of complicated runtime computations. More details relating to the disclosed technology are provided below.

Figure 1:
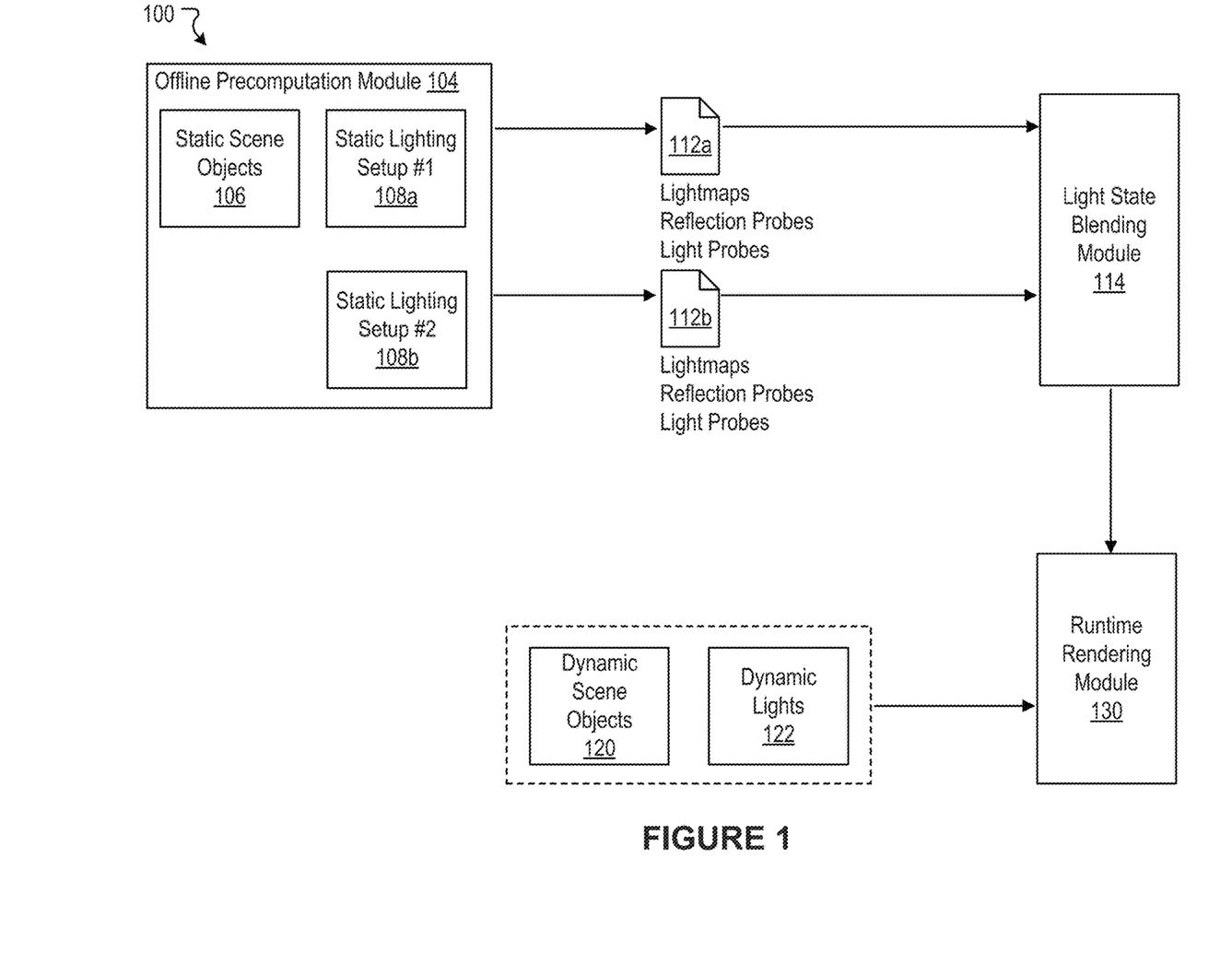
FIG. 1 illustrates an example system for generating dynamic, high-quality lighting in real-time digital animation applications, according to an embodiment of the present technology.

FIG. 1 illustrates an example system 100 that includes an offline precomputation module 104, a light state blending module 114, and a runtime rendering module 130, according to an embodiment of the present technology. The offline precomputation module 104, the light state blending module 114, and/or the runtime rendering module 130 can be implemented in one or more software applications running on one or more computing devices. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the offline precomputation module 104, the light state blending module 114, and/or the runtime rendering module 130 can be implemented in any suitable combinations.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a user or client computing device or on a server. For example, one or more modules and/or applications described herein, or at least a portion thereof, can be implemented as or within an application (e.g., app), a program, or an applet, etc., running on a user computing device or a client computing system. In another example, one or more modules and/or applications, or at least a portion thereof, can be implemented using one or more computing devices or systems that include one or more servers, such as network servers or cloud servers. It should be understood that there can be many variations or other possibilities.

The offline precomputation module 104 can be configured to receive static lighting information for a plurality of static lighting setups. The static lighting information may pertain to a scene to be rendered (e.g., in a real-time digital animation, in an immersive VR/AR application, etc.). The example scenario depicted in FIG. 1 shows two sets of static lighting information 108a, 108b for two different static lighting setups. Each set of static lighting information 108a, 108b may define a unique static lighting setup. In various embodiments, each set of static lighting information may define, for a static lighting setup, any combination of the following: how many static (e.g., stationary) lights are in the static lighting setup, the positions of each light within the scene, a size of each light (e.g., radius, height, length, width), a type of light for each light (e.g., point light, spotlight, etc.), a direction for each light, an intensity for each light, a color for each light, an attenuation radius for each light, and the like. By defining these various lighting characteristics, each set of static lighting information and its associated static lighting setup defines a unique lighting arrangement for the scene.

As can be seen in FIG. 1, the offline precomputation module 104 can also receive static scene object information 106 identifying one or more static (e.g., stationary) objects in the scene. The offline precomputation module 104 can be configured to, based on the static scene object information, precompute a set of global illumination information for each set of static lighting information. In other words, the offline precomputation module 104 can precompute a set of global illumination information for each static lighting setup in the scene. As such, once precomputation is completed, the result is a plurality of sets of global illumination information, wherein each set of global illumination information is associated with a particular static lighting setup. The set of global illumination information for a particular static lighting setup defines the direct and indirect lighting contributions at various positions within the scene by the static lights in the static lighting setup.

In various embodiments, a set of global illumination information can include lightmap data defining one or more lightmaps, light probe data defining one or more light probes, reflection probe data defining one or more reflection probes, or any combination thereof. A lightmap may comprise a two-dimensional texture map which stores, for each surface point in a scene, direct and indirect lighting contributions from the one or more static lights in a static lighting setup. A light probe may comprise a fixed number of spherical harmonics coefficients which indicate direct and indirect lighting contributions by the one or more static lights in a static lighting setup at a single volumetric (i.e. three-dimensional) position within the scene; different light probes are located at different positions. Light probes allow for high-quality (but low frequency) global illumination lighting on moving objects in the scene. A reflection probe may comprise a three-dimensional rendering of a scene environment (e.g., as a cube map) from a single volumetric (i.e. three-dimensional) position within the scene; different refection probes are located at different positions. Reflection probes can simulate reflections on surfaces.

As can be seen FIG. 1, the output of the offline precomputation module 104 is a plurality of sets of global illumination information (in this case, two sets of global illumination information 112a, 112b). The plurality of sets of global illumination information are provided to the light state blending module 114.

The light state blending module 114 can be configured to blend multiple static lighting setups by blending their corresponding sets of global illumination information. By blending multiple static lighting setups, the light state blending module 114 allows for a real-time digital animation to transition between multiple lighting setups. Furthermore, because the lighting characteristics of the different lighting setups have been precomputed offline, blending of different static lighting setups can be performed with minimal runtime computation.

In an embodiment, blending of static lighting setups can be performed as a linear interpolation between multiple sets of global illumination information. For example, consider an example scenario in which two static lighting setups, a first static lighting setup and a second static lighting setup, are being blended together. The first static lighting setup may be associated with a first set of global illumination information. The first set of global illumination information may include a first set of lightmap data defining a first set of lightmaps, a first set of light probe data defining a first set of light probes, and a first set of reflection probe data defining a first set of reflection probes. The second static lighting setup may be associated with a second set of global illumination information. The second set of global illumination information may include a second set of lightmap data defining a second set of lightmaps, a second set of light probe data defining a second set of light probes, and a second set of reflection probe data defining a second set of reflection probes. The two sets of global illumination information can be combined into a blended set of global illumination information that defines a blended lighting condition in which the lighting contributions of the first static lighting setup and the second static lighting setup are combined (or "blended"). For example, the first set of lightmaps can be blended with the second set of lightmaps as a linear interpolation of the texture map pixels in each set of lightmaps; any two pixels paired for such interpolation correspond to the same surface point in the scene. Each light probe in the first set of light probes may correspond to a respective light probe in the second set of light probes; the two corresponding light probes are located at the same three-dimensional position within the scene. Each light probe in the first set of light probes can be blended with its corresponding light probe in the second set of light probes based on linear interpolation (e.g., linear interpolation of their spherical harmonics coefficients). Similarly, each reflection probe in the first set of reflection probes may correspond to a respective reflection probe in the second set of reflection probes; the two corresponding reflection probes are located at the same three-dimensional position within the scene. Each reflection probe in the first set of reflection probes can be blended with its corresponding reflection probe in the second set of reflection probes as a linear interpolation of the cube map pixels in each pair of reflection probes; any two pixels paired for such interpolation correspond to the same reflection direction in the scene. Such combinations may also be performed with more than two static lighting setups (i.e., more than two sets of global illumination information). Such combinations may also be performed with two or more static lighting setups wherein some setups lack corresponding lightmaps, light probes, or reflection probes (e.g., because bandwidth or memory constraints prevented the transfer of all available global illumination information); in that case, the blending takes place using only the available information. Such combinations may also be performed with two or more static lighting setups wherein different setups include corresponding lightmaps, light probes, or reflection probes in different sampling resolutions (e.g. because bandwidth or memory constraints caused a high-resolution texture map to be down-sampled for transfer, resulting in only a low-resolution texture map made available for blending); in that case, the low-resolution data may be up-sampled or the high-resolution data may be down-sampled for blending. Such combinations may also be performed with two or more static lighting setups wherein different setups include corresponding lightmaps, light probes, or reflection probes for whom positioning, orienting, or sampling used different coordinate systems (e.g., due to variations or rounding errors in the computer systems that precomputed the global illumination information); in that case, the data is repositioned or reoriented to the same coordinate system for blending. The blended set of global illumination information, which represents a blend of multiple static lighting setups, can be passed to the runtime rendering module 130.

The runtime rendering module 130 can receive the blended set of global illumination information associated with a plurality of static lighting setups. The runtime rendering module 130 can also receive dynamic scene information 120 defining one or more dynamic (e.g., non-stationary) objects in a scene. The runtime rendering module 130 can also receive dynamic lighting information 122 pertaining to one or more dynamic lights. Whereas the lighting contributions of various static lighting setups were pre-computed by the offline precomputation module 104, the lighting contributions of the one or more dynamic lights are performed at runtime by the runtime rendering module 130. The runtime rendering module can render the scene based on the blended set of global illumination information, the dynamic scene information 120, and the dynamic light information 122. In an embodiment, the scene may be rendered in a real-time immersive application, such as a virtual reality (VR) or augmented reality (AR) application. The scene objects rendered in the offline precomputation module 114 are typically not identical to the scene objects rendered in the runtime rendering module 130, even though there is considerable overlap.

Figure 2:
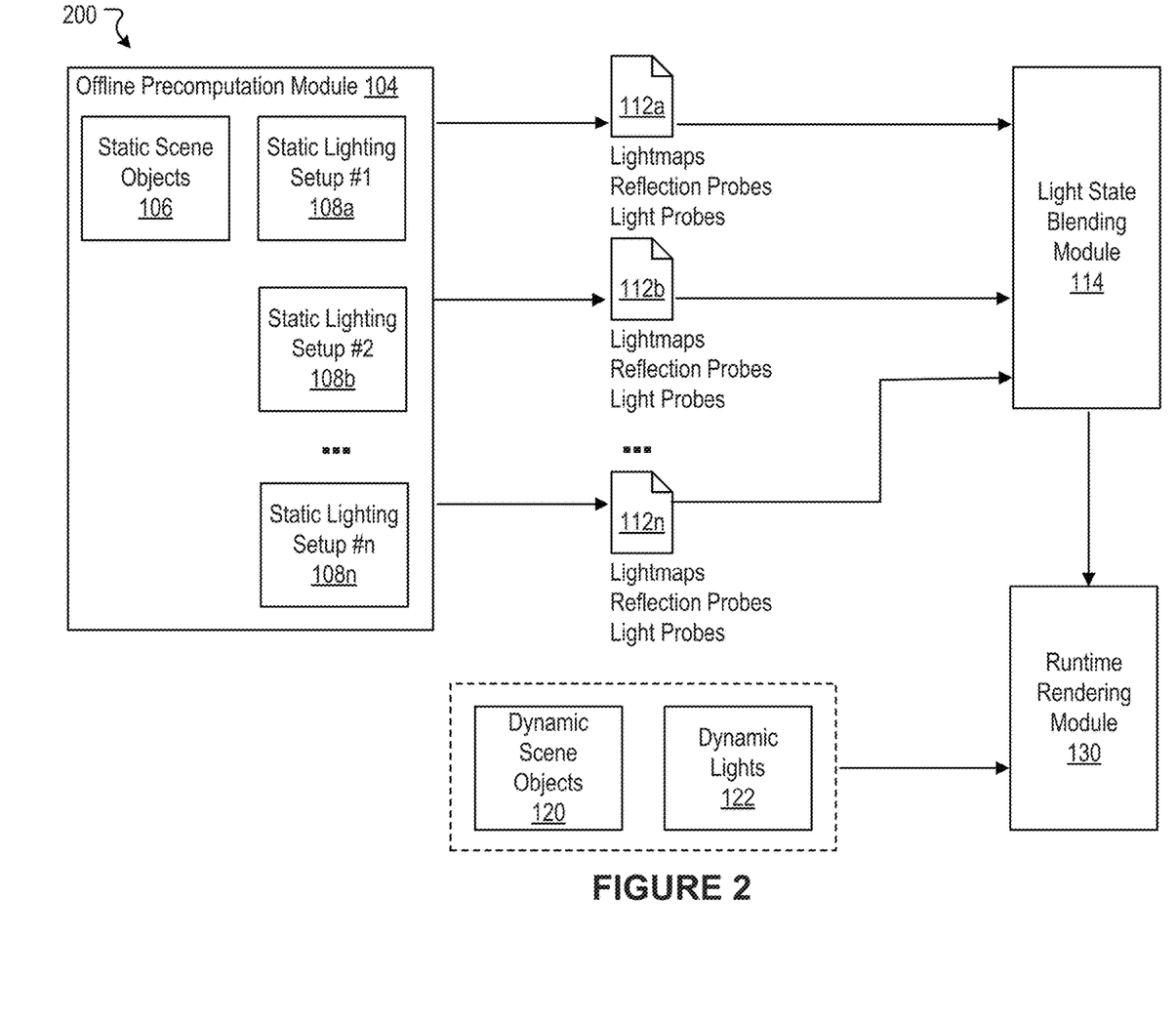
FIG. 2 illustrates an example system for generating dynamic, high-quality lighting in real-time digital animation applications, according to an embodiment of the present technology.

It should be understood that the blended set of global illumination information can change over time as a scene in an animation is being rendered and as the animation progresses. For example, the scene may involve a first static lighting setup initially being turned off, and a second static lighting setup initially being turned on, and then as the animation progresses, the first static lighting setup may gradually be turned on while the second static lighting setup may be gradually dimmed, etc. Any combinations of multiple static lighting setups are possible. This may be done, for example, by adjusting a weight associated with each static lighting setup in a scene at different times during the animation. As the weights of each static lighting setup are adjusted up or down, the set of blended global illumination information can be adjusted/modified, and the lighting of the scene will change accordingly. In this way, an animator can transition between numerous static lighting setups of a scene without those changes negatively affecting runtime performance. To speed up this repeated blending of the same original global illumination information using different weights as the animation progresses, the light state blending module 114 may choose to down-sample and cache the global illumination information into multiple resolutions, and choose among them at runtime for blending based on the resource constraints of the runtime rendering module 130. FIG. 2 illustrates the same functional block diagram as that shown in FIG. 1, but rather than having only two static lighting setups, the scenario in FIG. 2 illustrates n static lighting setups 108a-n.

Figure 3:
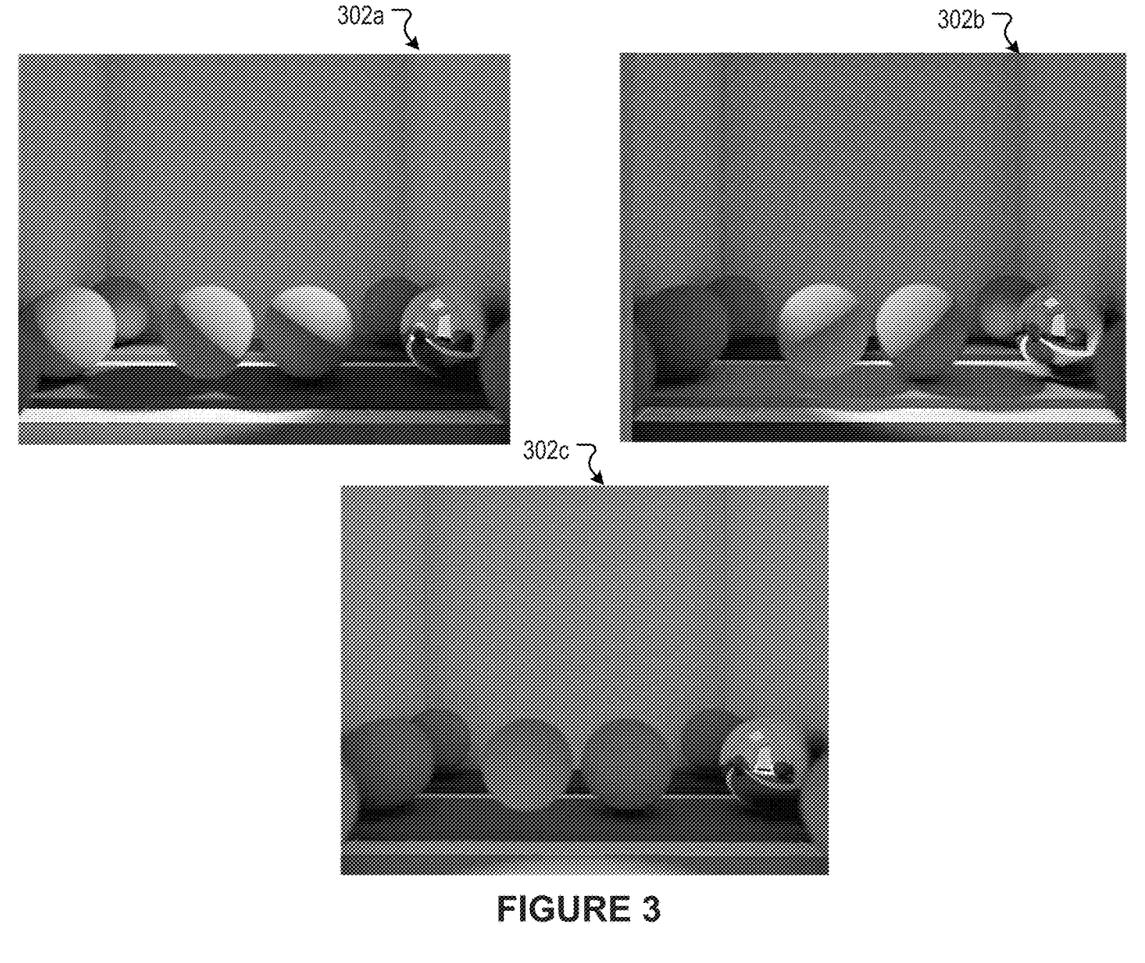
FIG. 3 illustrates three different static lighting setups in a Cornell Box test, according to an embodiment of the present technology.

FIG. 3 illustrates three snapshots 302a, 302b, 302c of a scene (a Cornell box) under different static lighting setups. In the first snapshot 302a, a first static lighting setup includes a directed light from a top right corner of the scene. In the second snapshot 302b, a second static lighting setup includes a directed light from a top left corner of the scene. In the third snapshot 302c, a third static lighting setup includes a diffuse light coming from directly above the scene. Each of these three different static lighting setups generates a unique set of global illumination information. The three sets of global illumination information can be precomputed. At runtime, the three different static lighting setups can be blended in different weightings and combinations to dynamically change the lighting in the scene.

Although example blending approaches have been discussed using linear interpolation of global illumination information, the present technology can utilize more complex blending algorithms. For example, interpolation of global illumination information may be non-linear but in a manner such that it is perceived as linear by the viewer due to non-linear effects in viewing equipment or perception biology, interpolation across more than two static lighting setups may use a polynomial or spline blending function to ensure a continuous first derivative throughout the animation, etc. Furthermore, while the blending between different static lighting setups can be keyed to a linear time progression of a scene, more complex blends are possible. For example, the blend can be calculated based on procedural code, character AI systems, and/or event-based triggers.

Figure 4:
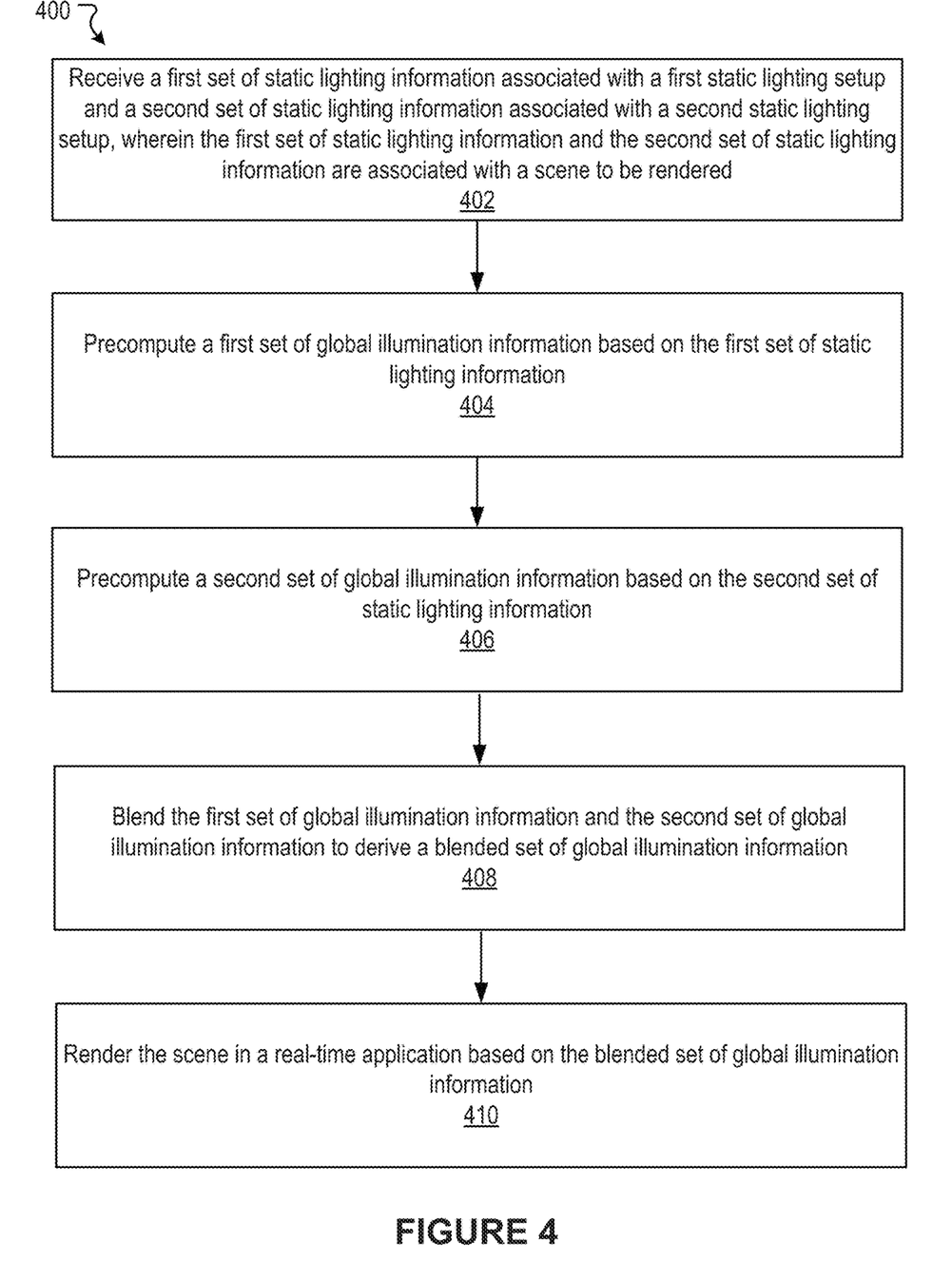
FIG. 4 illustrates an example method, according to an embodiment of the present technology.

FIG. 4 illustrates an example method 400, according to an embodiment of the present technology. At block 402, the method 400 can receive a first set of static lighting information associated with a first static lighting setup and a second set of static lighting information associated with a second static lighting setup, wherein the first set of static lighting information and the second set of static lighting information are associated with a scene to be rendered. At block 404, the method 400 can precompute a first set of global illumination information based on the first set of static lighting information. At block 406, the method 400 can precompute a second set of global illumination information based on the second set of static lighting information. At block 408, the method 400 can blend the first set of global illumination information and the second set of global illumination information to derive a blended set of global illumination information. At block 410, the method 400 can render the scene in a real-time application based on the blended set of global illumination information.

Many variations to the example methods are possible. It should be appreciated that there can be additional, fewer, or alternative steps performed in similar or alternative orders, or in parallel, within the scope of the various embodiments discussed herein unless otherwise stated.

Hardware Implementation

Figure 5:
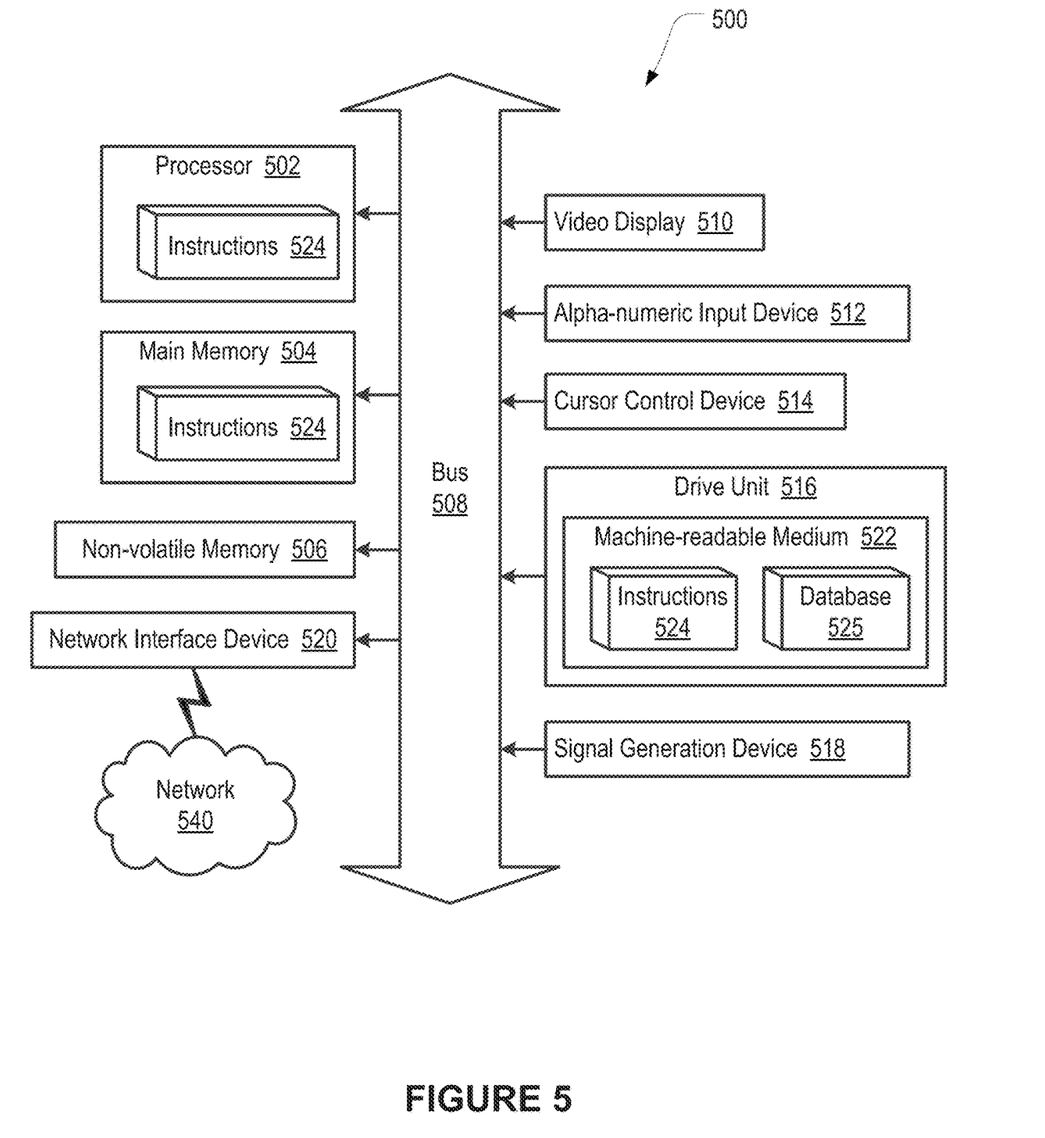
FIG. 5 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 5 illustrates an example machine 500 within which a set of instructions for causing the machine to perform one or more of the embodiments described herein can be executed, in accordance with an embodiment of the present technology. The embodiments can relate to one or more systems, methods, or computer readable media. The machine may be connected (e.g., networked) to other machines. In a networked deployment, the machine may operate in the capacity of a server or a client machine in a client-server network environment, or as a peer machine in a peer-to-peer (or distributed) network environment.

The computer system 500 includes a processor 502 (e.g., a central processing unit (CPU), a graphics processing unit (GPU), or both), a main memory 504, and a nonvolatile memory 506 (e.g., volatile RAM and non-volatile RAM, respectively), which communicate with each other via a bus 508. The processor 502 can be implemented in any suitable form, such as a parallel processing system. In some cases, the example machine 500 can correspond to, include, or be included within a computing device or system. For example, in some embodiments, the machine 500 can be a desktop computer, a laptop computer, personal digital assistant (PDA), an appliance, a wearable device, a camera, a tablet, or a mobile phone, etc. In one embodiment, the computer system 500 also includes a video display 510, an alphanumeric input device 512 (e.g., a keyboard), a cursor control device 514 (e.g., a mouse), a drive unit 516, a signal generation device 518 (e.g., a speaker) and a network interface device 520.

In one embodiment, the video display 510 includes a touch sensitive screen for user input. In one embodiment, the touch sensitive screen is used instead of a keyboard and mouse. The disk drive unit 516 includes a machine-readable medium 522 on which is stored one or more sets of instructions 524 (e.g., software) embodying any one or more of the methodologies or functions described herein. The instructions 524 can also reside, completely or at least partially, within the main memory 504 and/or within the processor 502 during execution thereof by the computer system 500. The instructions 524 can further be transmitted or received over a network 540 via the network interface device 520. In some embodiments, the machine-readable medium 522 also includes a database 525.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 506 may also be a random access memory. The non-volatile memory 506 can be a local device coupled directly to the rest of the components in the computer system 500. A non-volatile memory that is remote from the system, such as a network storage device coupled to any of the computer systems described herein through a network interface such as a modem or Ethernet interface, can also be used.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. The term "machine-readable medium" shall accordingly be taken to include, but not be limited to, solid-state memories, optical and magnetic media, and carrier wave signals. The term "storage module" as used herein may be implemented using a machine-readable medium.

In general, routines executed to implement the embodiments of the invention can be implemented as part of an operating system or a specific application, component, program, object, module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 500 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "in various embodiments," or the like means that a particular feature, design, structure, or characteristic described in connection with the embodiment is included in at least one embodiment of the disclosure. The appearances of, for example, the phrases "according to an embodiment", "in one embodiment", "in an embodiment", "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, a first set of static lighting information associated with a first static lighting setup and a second set of static lighting information associated with a second static lighting setup, wherein the first set of static lighting information and the second set of static lighting information are associated with a scene to be rendered;
precomputing, by the computing system, a first set of global illumination information based on the first set of static lighting information, wherein the first set of global illumination information comprises i) a first set of light probe data associated with a first set of light probes and a first set of spherical harmonics coefficients and ii) a first set of lightmap data associated with a texture map that stores lighting contributions from static lights for surface points in the scene;
precomputing, by the computing system, a second set of global illumination information based on the second set of static lighting information, wherein the second set of global illumination information comprises i) a second set of light probe data associated with a second set of light probes and a second set of spherical harmonics coefficients and ii) a second set of lightmap data;
changing, by the computing system, a weight of the first set of global illumination information comprising the first set of light probe data and the first set of lightmap data or the second set of global illumination information comprising the second set of light probe data and the second set of lightmap data;
determining, by the computing system, the first set of light probe data and the first set of lightmap data of the first set of global illumination information are associated with relatively lower resolution data compared to the second set of light probe data and the second set of lightmap data;
in response to the determining, up-sampling, by the computing system, the first set of light probe data and the first set of lightmap data prior to the blending;
blending, by the computing system, the first set of global illumination information and the second set of global illumination information to derive a blended set of global illumination information, wherein the blending comprises, based on the changed weight, blending the first set of light probe data and the first set of lightmap data and, respectively, the second set of light probe data and the second set of lightmap data, wherein
the blending is based at least in part on interpolation of at least one spherical harmonics coefficient associated with the first set of light probe data and at least one corresponding spherical harmonics coefficient associated with the second set of light probe data,
each light probe in the first set of light probes corresponds to a respective light probe in the second set of light probes, the two corresponding light probes located at the same three-dimensional position within the scene; and rendering, by the computing system, the scene based on the blended set of global illumination information.

2. The computer-implemented method of claim 1, wherein
the first set of global illumination information comprises a first set of reflection probe data associated with a first set of reflection probes,
the second set of global illumination information comprises a second set of reflection probe data associated with a second set of reflection probes, and
the blending the first set of global illumination information and the second set of global illumination information comprises blending the first set of reflection probe data and the second set of reflection probe data.

3. The computer-implemented method of claim 2, wherein
the blending the first set of reflection probe data and the second set of reflection probe data is based at least in part on interpolation of cube map pixels associated with the first reflection probe data and the second reflection probe data, and
each reflection probe in the first set of reflection probes corresponds to a respective reflection probe in the second set of reflection probes, the two corresponding reflection probes located at the same three-dimensional position within the scene.

4. The computer-implemented method of claim 3, wherein two pixels paired for interpolation correspond to the same reflection direction in the scene.

5. The computer-implemented method of claim 1, wherein the rendering comprises changing the blended set of global illumination information over time as the scene is being rendered.

6. The computer-implemented method of claim 5, wherein the blended set of global illumination information changes over time as the scene is being rendered by changing a first weight associated with the first set of global illumination information over time as the scene is being rendered.

7. The computer-implemented method of claim 1, wherein the rendering the scene based on the blended set of global illumination information comprises rendering the scene in a real-time immersive application based on the blended set of global illumination information.

8. The computer-implemented method of claim 1, further comprising:
receiving a third set of static lighting information associated with a third static lighting setup, and
precomputing a third set of global illumination information based on the third set of static lighting information, wherein
the blending the first set of global illumination information and the second set of global illumination information to derive a blended set of global illumination information further comprises blending the first set of global illumination information, the second set of global illumination information, and the third set of global illumination information to derive the blended set of global illumination information.

9. The computer-implemented method of claim 1, wherein the global illumination information undergoes further processing prior to blending the first set of global illumination information and the second set of global illumination information, and further wherein the further processing comprises at least one of: down-sampling the first set of global illumination information and the second set of global illumination information or caching the first set of global illumination information and the second set of global illumination information.

10. The computer-implemented method of claim 1, further comprising receiving dynamic light information associated with one or more dynamic lights and dynamic scene information associated with one or more dynamic objects to be computed at runtime, wherein rendering the scene is performed further based on the dynamic light information and the dynamic scene information.

11. The computer-implemented method of claim 1, wherein
the blending is based at least in part on interpolation of texture map pixels associated with the first set of lightmap data and the second set of lightmap data, and
two pixels paired for interpolation correspond to a same surface point in the scene.

12. The computer-implemented method of claim 1, wherein the first set of static lighting information and the second set of static lighting information comprise differences in the scene in relation to at least one of: numbers of lights, positions of lights, sizes of lights, types of lights, directions of lights, intensities of lights, colors of lights, and attenuation radii of lights.

13. The computer-implemented method of claim 1, wherein the interpolation is non-linear.

14. A system comprising:
at least one processor; and
a memory storing instructions that, when executed by the at least one processor, cause the system to perform a method comprising:
receiving a first set of static lighting information associated with a first static lighting setup and a second set of static lighting information associated with a second static lighting setup, wherein the first set of static lighting information and the second set of static lighting information are associated with a scene to be rendered;
precomputing a first set of global illumination information based on the first set of static lighting information, wherein the first set of global illumination information comprises i) a first set of light probe data associated with a first set of light probes and a first set of spherical harmonics coefficients and ii) a first set of lightmap data associated with a texture map that stores lighting contributions from static lights for surface points in the scene;
precomputing a second set of global illumination information based on the second set of static lighting information, wherein the second set of global illumination information comprises i) a second set of light probe data associated with a second set of light probes and a second set of spherical harmonics coefficients and ii) a second set of lightmap data;
changing a weight of the first set of global illumination information comprising the first set of light probe data and the first set of lightmap data or the second set of global illumination information comprising the second set of light probe data and the second set of lightmap data;
determining the first set of light probe data and the first set of lightmap data of the first set of global illumination information are associated with relatively lower resolution data compared to the second set of light probe data and the second set of lightmap data;

in response to the determining, up-sampling the first set of light probe data and the first set of lightmap data prior to the blending;

blending the first set of global illumination information and the second set of global illumination information to derive a blended set of global illumination information, wherein the blending comprises, based on the changed weight, blending the first set of light probe data and the first set of lightmap data and, respectively, the second set of light probe data and the second set of lightmap data, wherein the blending is based at least in part on interpolation of at least one spherical harmonics coefficient associated with the first set of light probe data and at least one corresponding spherical harmonics coefficient associated with the second set of light probe data, each light probe in the first set of light probes corresponds to a respective light probe in the second set of light probes, the two corresponding light probes located at the same three-dimensional position within the scene; and rendering the scene based on the blended set of global illumination information.

15. The system of claim 14, wherein the first set of global illumination information comprises a first set of reflection probe data associated with a first set of reflection probes, the second set of global illumination information comprises a second set of reflection probe data associated with a second set of reflection probes, and the blending the first set of global illumination information and the second set of global illumination information comprises blending the first set of reflection probe data and the second set of reflection probe data.

16. The system of claim 14, wherein the rendering comprises changing the blended set of global illumination information over time as the scene is being rendered.

17. The system of claim 16, wherein the blended set of global illumination information changes over time as the scene is being rendered by changing a first weight associated with the first set of global illumination information over time as the scene is being rendered.

18. A non-transitory computer-readable storage medium including instructions that, when executed by at least one processor of a computing system, cause the computing system to perform a method comprising:

receiving a first set of static lighting information associated with a first static lighting setup and a second set of static lighting information associated with a second static lighting setup, wherein the first set of static lighting information and the second set of static lighting information are associated with a scene to be rendered;

precomputing a first set of global illumination information based on the first set of static lighting information, wherein the first set of global illumination information comprises i) a first set of light probe data associated with a first set of light probes and a first set of spherical harmonics coefficients and ii) a first set of lightmap data associated with a texture map that stores lighting contributions from static lights for surface points in the scene;

precomputing a second set of global illumination information based on the second set of static lighting information, wherein the second set of global illumination information comprises i) a second set of light probe data associated with a second set of light probes and a second set of spherical harmonics coefficients and ii) a second set of lightmap data;

changing a weight of the first set of global illumination information comprising the first set of light probe data and the first set of lightmap data or the second set of global illumination information comprising the second set of light probe data and the second set of lightmap data;

determining the first set of light probe data and the first set of lightmap data of the first set of global illumination information are associated with relatively lower resolution data compared to the second set of light probe data and the second set of lightmap data;

in response to the determining, up-sampling the first set of light probe data and the first set of lightmap data prior to the blending;

blending the first set of global illumination information and the second set of global illumination information to derive a blended set of global illumination information, wherein the blending comprises, based on the changed weight, blending the first set of light probe data and the first set of lightmap data and, respectively, the second set of light probe data and the second set of lightmap data, wherein the blending is based at least in part on interpolation of at least one spherical harmonics coefficient associated with the first set of light probe data and at least one corresponding spherical harmonics coefficient associated with the second set of light probe data, each light probe in the first set of light probes corresponds to a respective light probe in the second set of light probes, the two corresponding light probes located at the same three-dimensional position within the scene; and rendering the scene based on the blended set of global illumination information.

19. The non-transitory computer-readable storage medium of claim 16, wherein the first set of global illumination information comprises a first set of reflection probe data associated with a first set of reflection probes, the second set of global illumination information comprises a second set of reflection probe data associated with a second set of reflection probes, and the blending the first set of global illumination information and the second set of global illumination information comprises blending the first set of reflection probe data and the second set of reflection probe data.

20. The non-transitory computer-readable storage medium of claim 18, wherein the rendering comprises changing the blended set of global illumination information over time as the scene is being rendered.

* * * * *